United States Patent [19]

Ambrose et al.

[11] Patent Number: 5,715,450

[45] Date of Patent: Feb. 3, 1998

[54] METHOD OF SELECTING AND PRESENTING DATA FROM A DATABASE USING A QUERY LANGUAGE TO A USER OF A COMPUTER SYSTEM

[75] Inventors: Jesse Lee Ambrose, Sunnyvale; Thomas Michael Rothwein, San Jose, both of Calif.

[73] Assignee: Siebel Systems, Inc., San Mateo, Calif.

[21] Appl. No.: 535,553

[22] Filed: Sep. 27, 1995

[51] Int. Cl.⁶ .................................................. G06F 17/30
[52] U.S. Cl. ........................... 395/614; 395/201; 395/762
[58] Field of Search ................................... 395/614, 201, 395/762

[56] References Cited

U.S. PATENT DOCUMENTS

| | | | |
|---|---|---|---|
| 5,566,330 | 10/1996 | Sheffield | 395/600 |
| 5,572,643 | 11/1996 | Judson | 395/793 |
| 5,581,758 | 12/1996 | Burnett | 395/614 |
| 5,630,125 | 5/1997 | Zellweger | 395/614 |

OTHER PUBLICATIONS

Text Search and Retrieval Training Manual for the Automated Patent System (APS): US Depart. of Commerce, USPTO (Dec. 3, 1991).

*Primary Examiner*—Thomas G. Black
*Assistant Examiner*—Diane D. Mizrahi
*Attorney, Agent, or Firm*—Cooley Godward LLP

[57] ABSTRACT

A thread management system for implementation within a computer system having a database disposed to be accessed through queries provided by a system user is disclosed herein. In this environment the thread management system provides a mechanism for subsequent replication of a sequence of one or more of such queries made by the system user. In a preferred implementation, a first thread step object is generated upon a first of the queries being provided to the database. The thread step object is formed so as to include information relating to a first state of the database. A representation of the first thread step object is then presented to the system user via a display of the computer system. Upon the system user selecting the representation of the first thread step object, the first of the queries to the database is replicated. A second thread step object may be generated upon provision of a second of the queries to the database. The second thread step object is created so as to include information relating to a second state of the database. In an exemplary implementation a thread object is then formed from the first and second thread step objects, and a representation of the thread object is displayed to the system user. Upon the system user selecting the representation of the thread object, the first and second queries to the database are replicated.

10 Claims, 12 Drawing Sheets

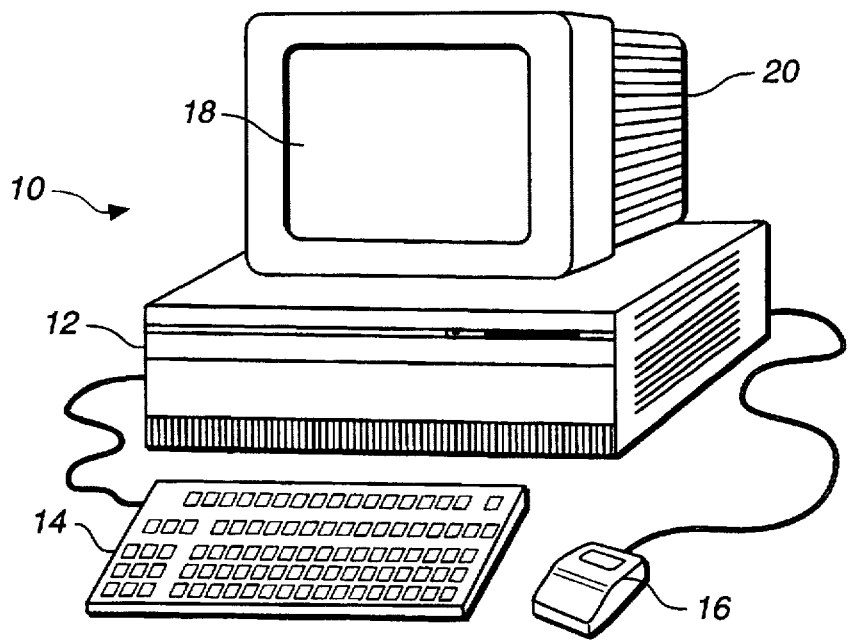
FIG._1
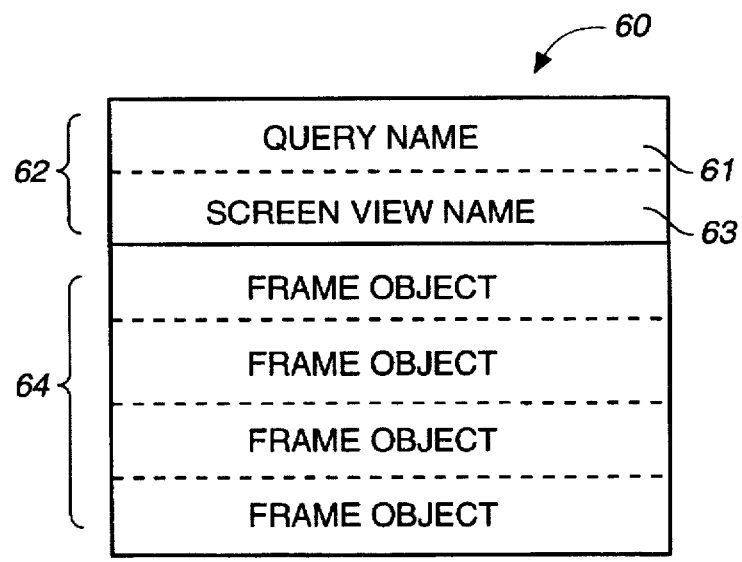
FIG._3

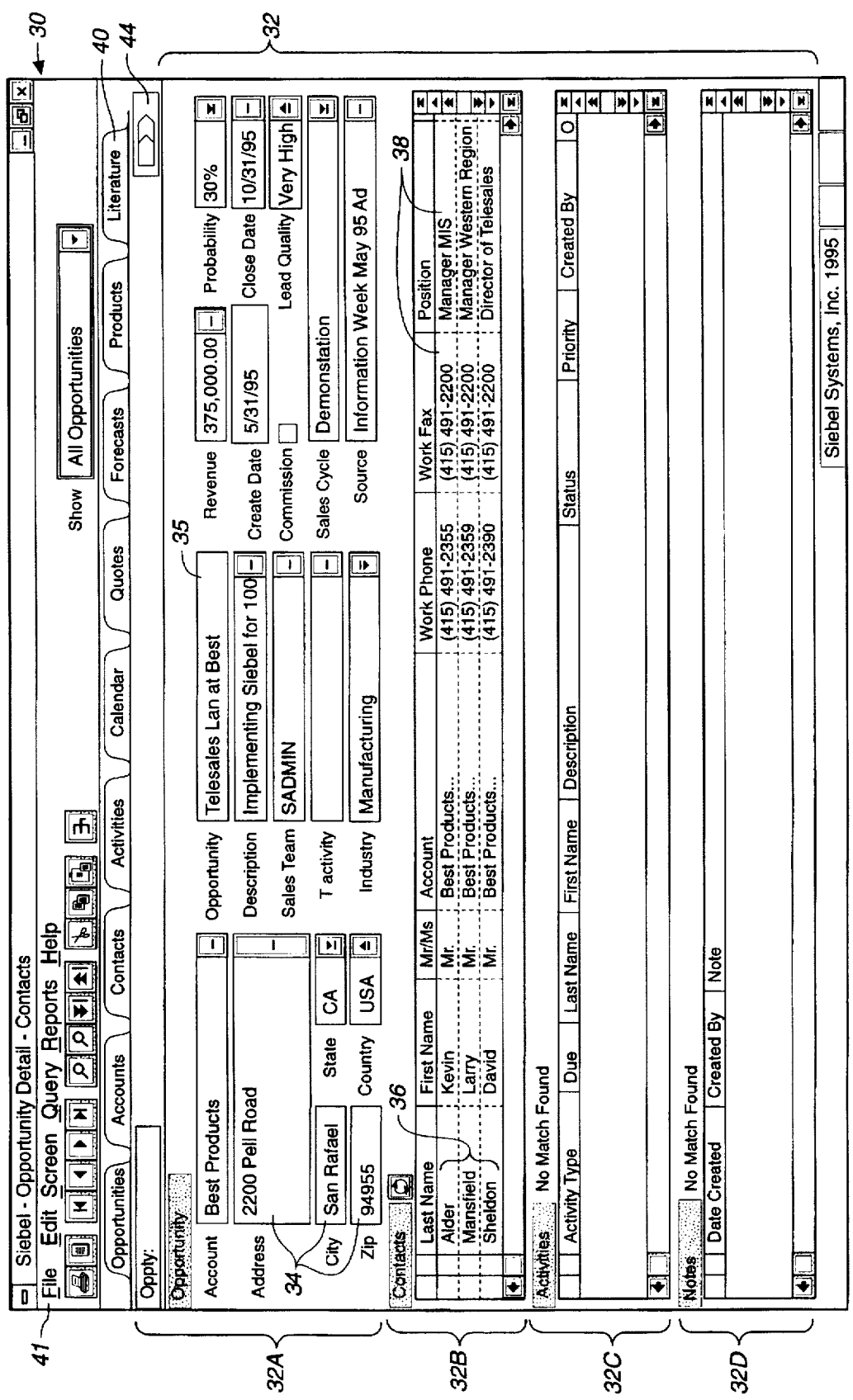
FIG._2

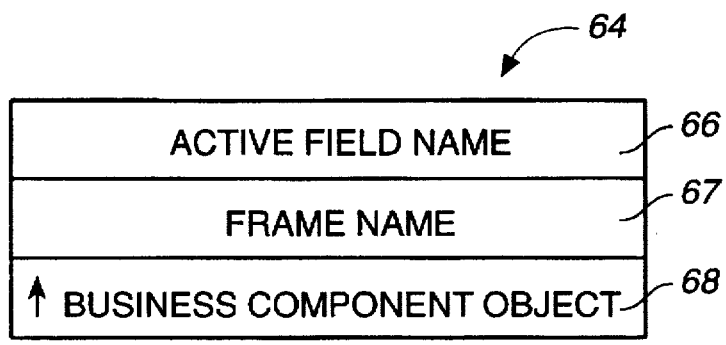
FIG._4
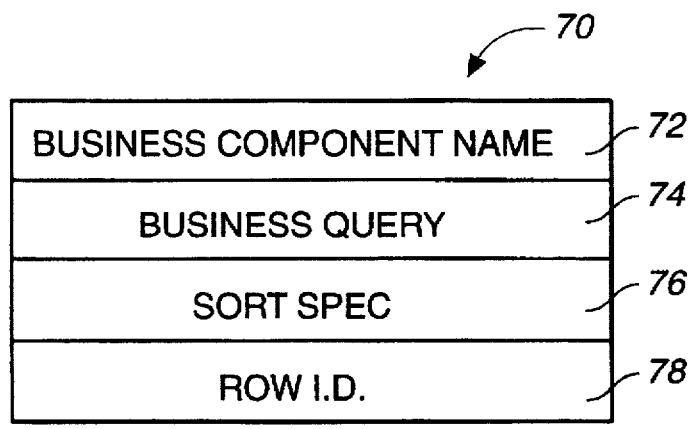
FIG._5
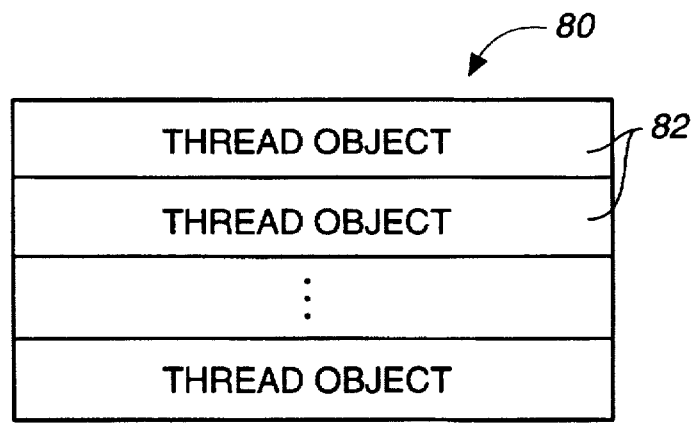
FIG._6

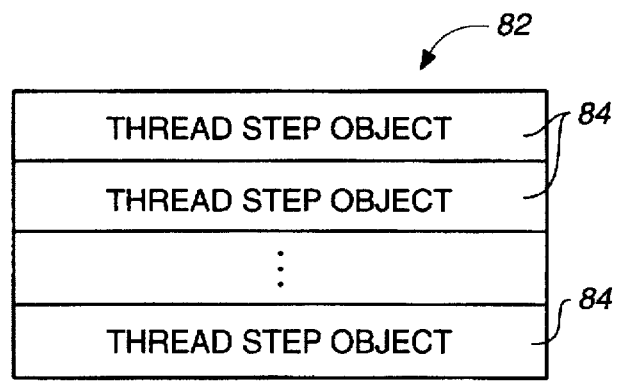
FIG._7
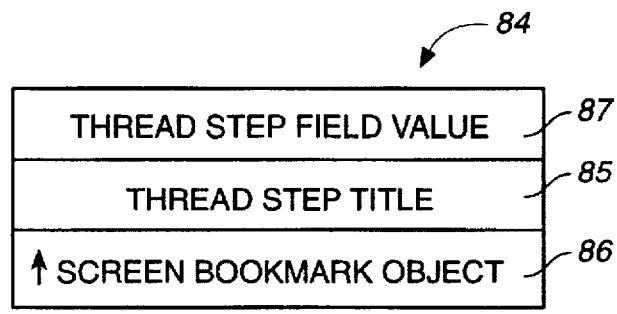
FIG._8
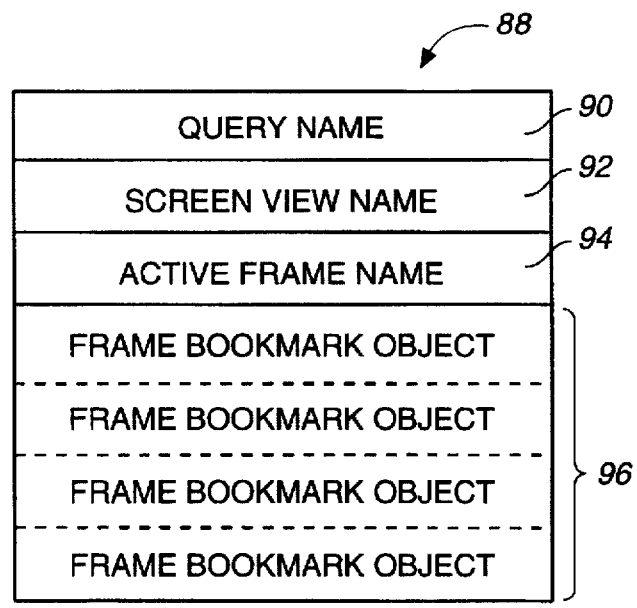
FIG._9

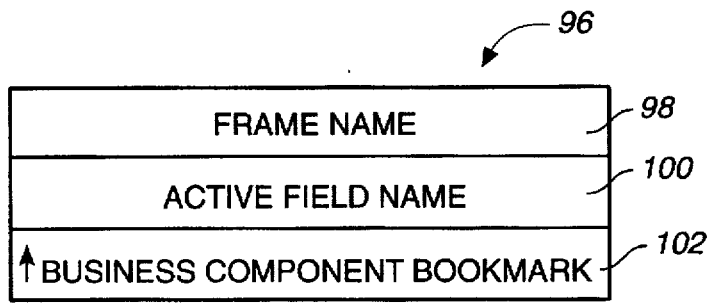
FIG._10
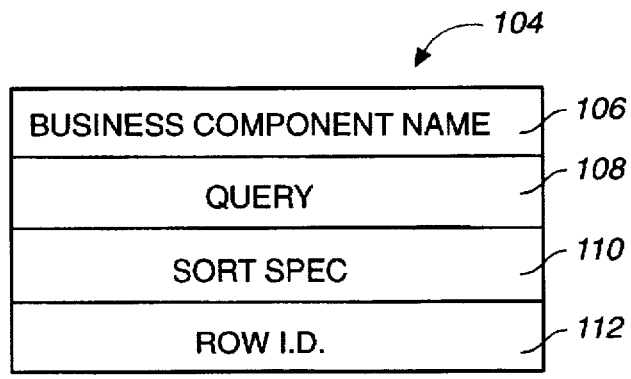
FIG._11
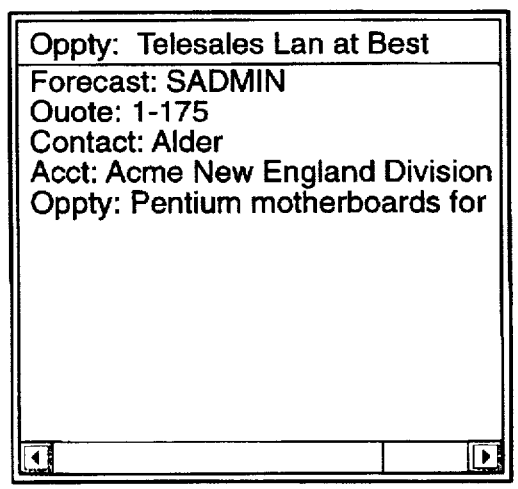
FIG._19

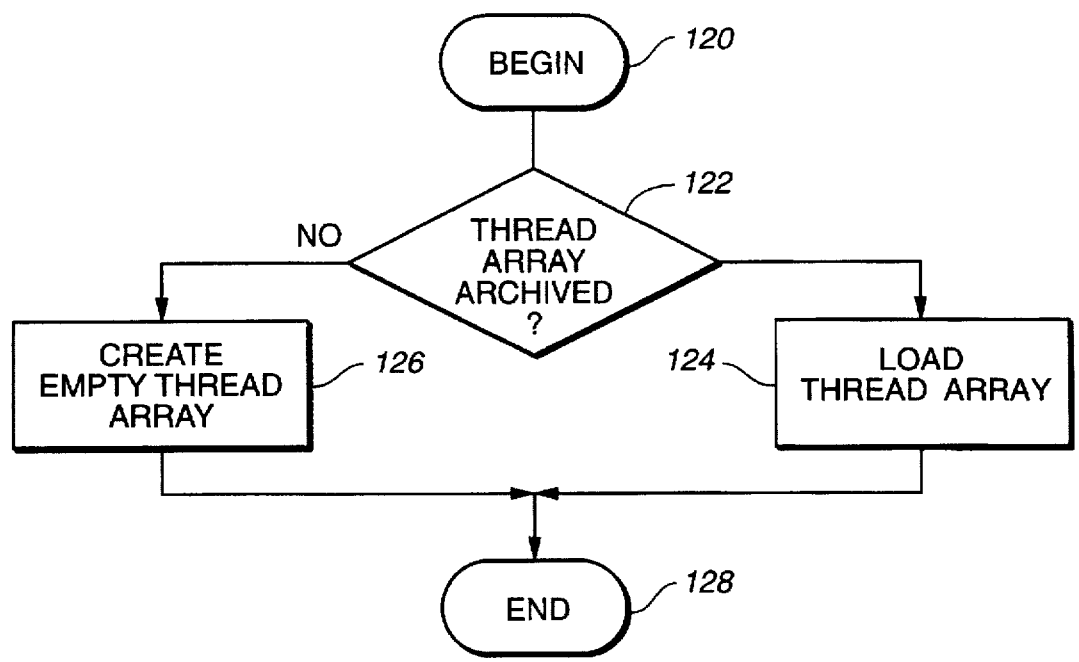
FIG._12
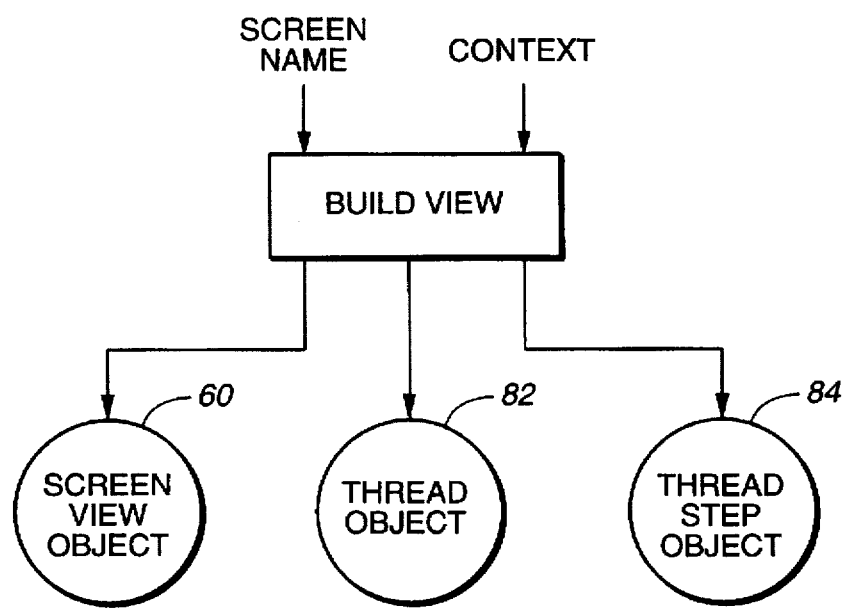
FIG._13B

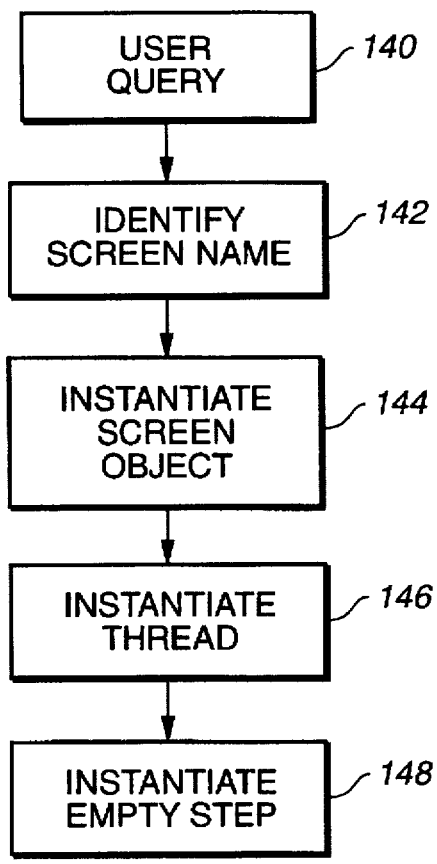
FIG._13A
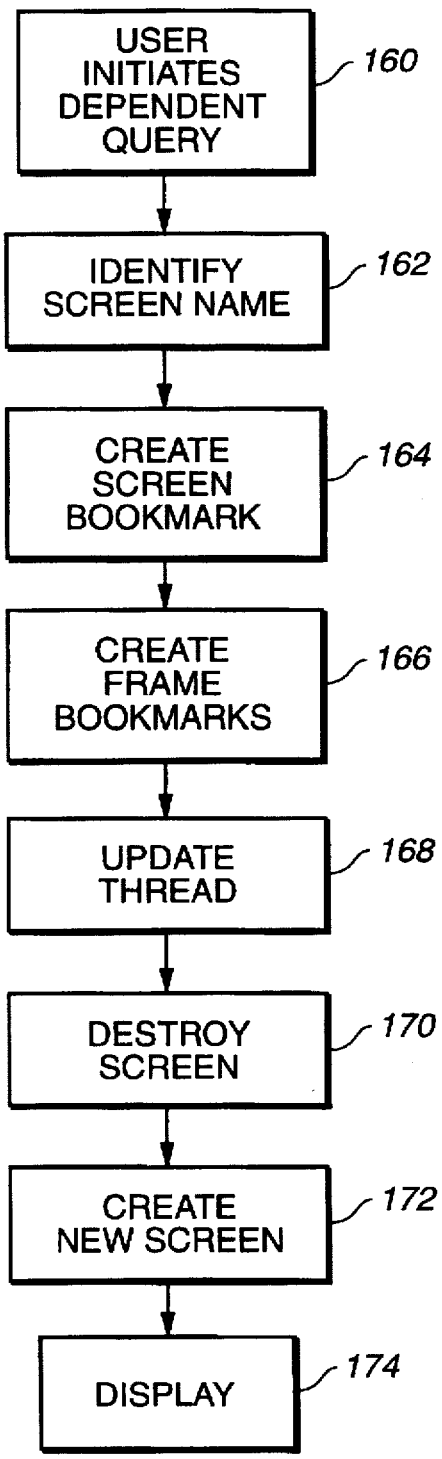
FIG._14A

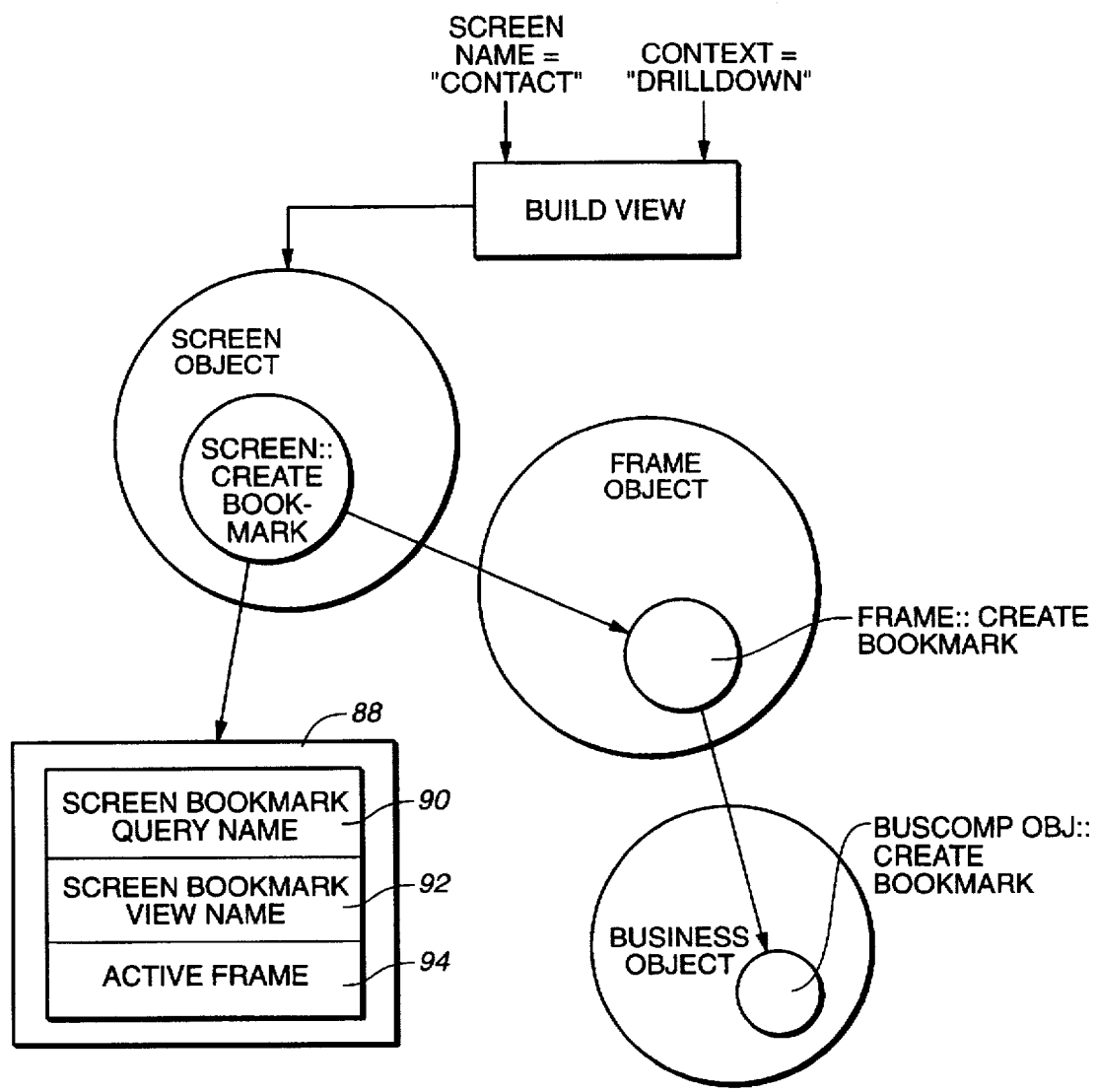
FIG._14B

FIG._15

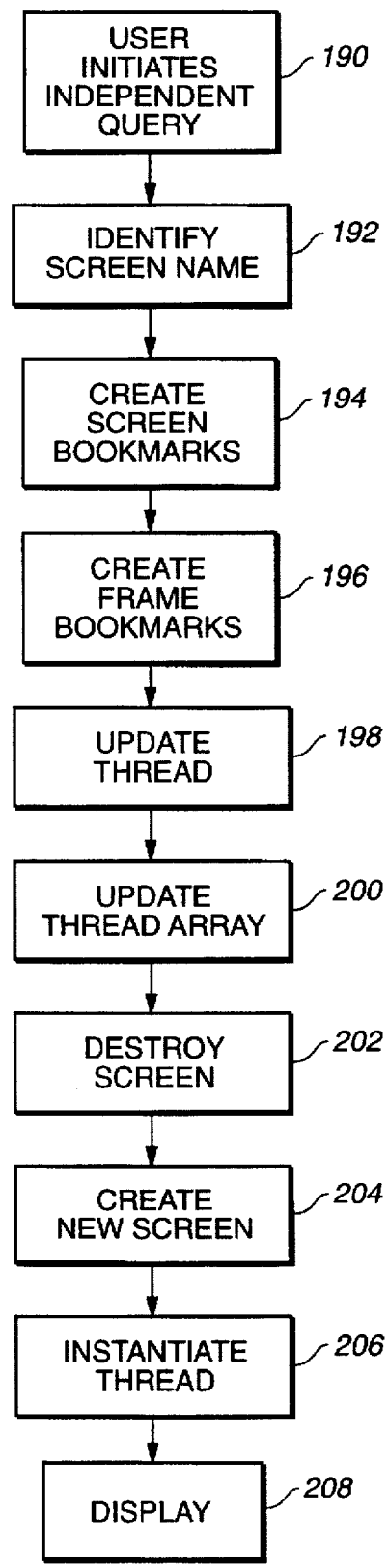
FIG._16

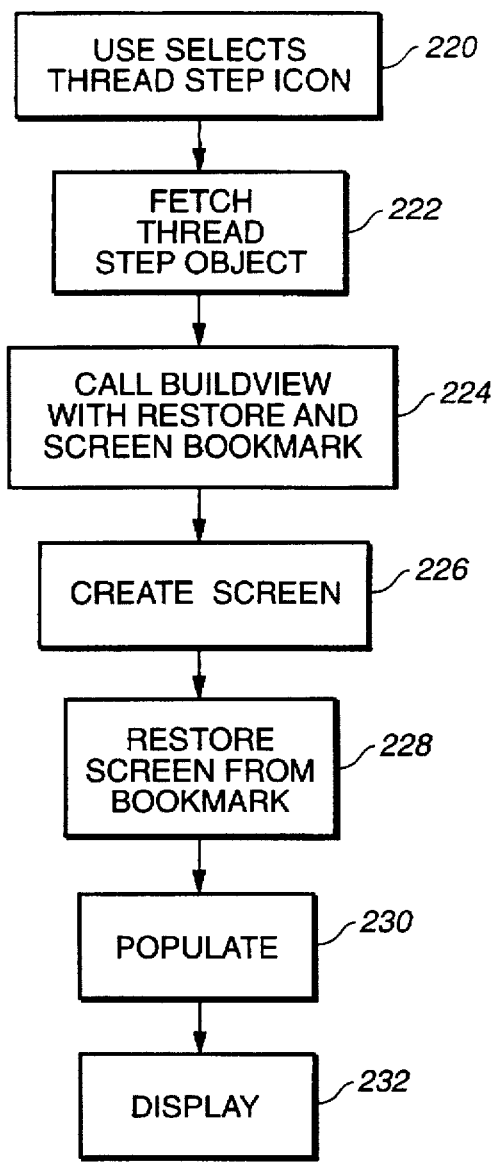
FIG._17
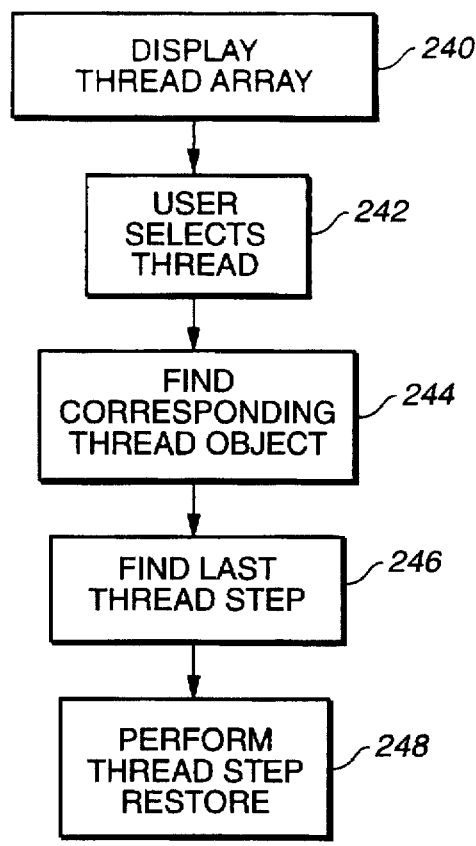
FIG._18

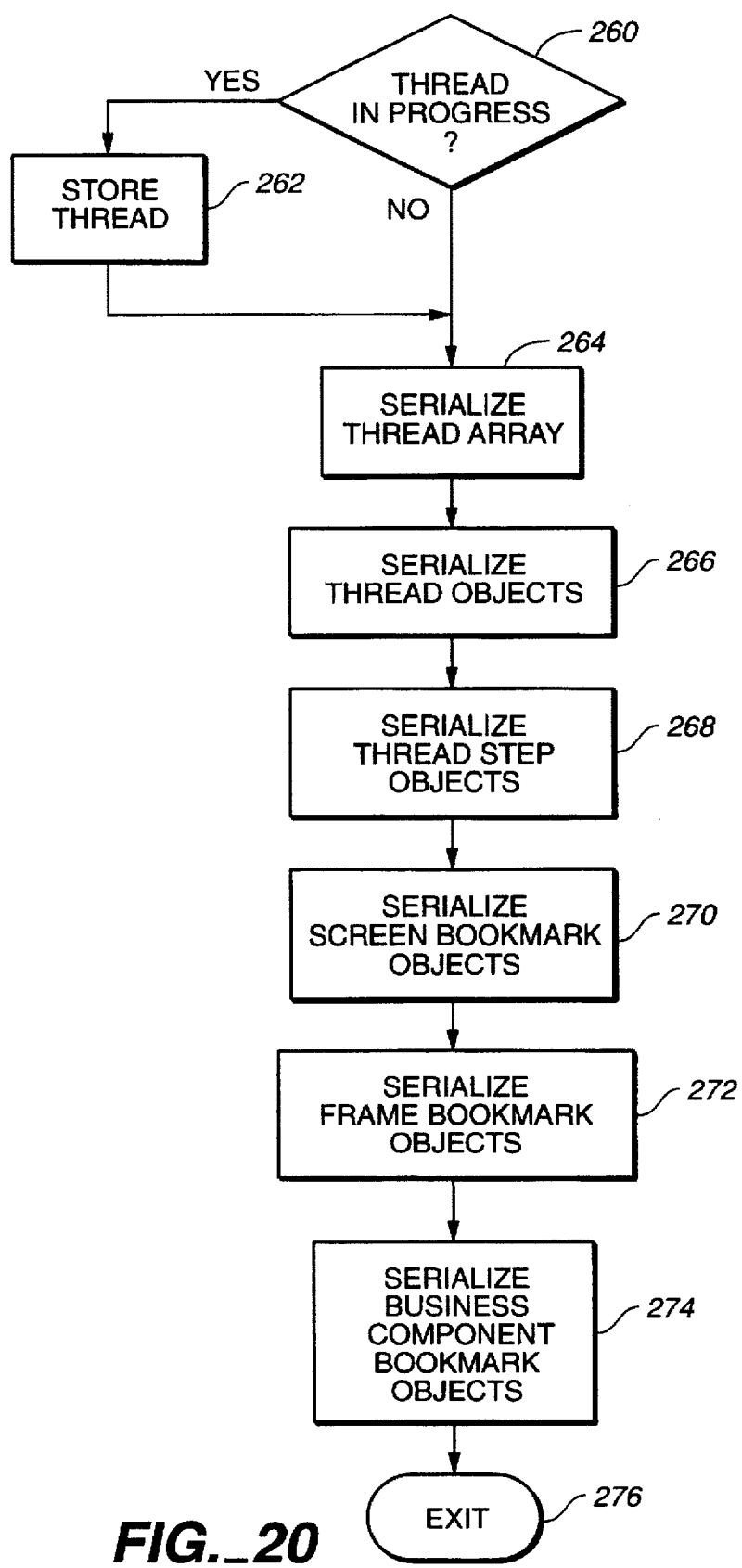
FIG._20

1

METHOD OF SELECTING AND PRESENTING DATA FROM A DATABASE USING A QUERY LANGUAGE TO A USER OF A COMPUTER SYSTEM

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

INTRODUCTION

1. Technical Field

This invention relates to a system and method for interacting with a computer system database, and, more particularly, for providing a representation of such interaction to system users.

2. Background

Many computer programs endeavor to present data to users in ways that are convenient for the user to specify, and that do not require overly complex programming to tailor for a specific application. In this regard, some computer programs function to record information relating to previously viewed data so as to permit a user to subsequently recall a selected portion of the previously viewed data.

For example, a number of commercially available programs include a history logging facility to record recently viewed data. Specifically, the word processing program MICROSOFT WORD™ maintains a "recently used file list." This is a list of an arbitrary number of the files that have been most recently edited using MICROSOFT WORD™. The list is saved between invocations of Word, and is optionally displayed as a series of menu items on a menu displayed to the user. The menu items correspond to the names of the files. If a user desires to edit one of the files listed, the user may select the file name. MICROSOFT WORD™ responds as though the user had entered the full file name in response to an "Open File" dialog, thereby permitting the user to resume editing the file. Although the recently used file list is useful for recalling a specific file for further editing, its role is limited to that of obtaining the file and applying formatting and other information stored within the file. No contextual information about how the file was displayed is retained. That is, when a file is loaded from the recently used file list, contextual information such as indication of a particular page that was being viewed by the user in the previous session, a previous cursor location, etc. and the like is not also replicated by the loading process.

In database environments, it would be particularly advantageous to provide a contextually complete production of a previously-displayed screen of data. Although numerous database products offer the capability to store database queries for future repeated execution, these products require affirmative efforts on the part of the user to store the query. Moreover, with most stored query-based database systems, not all contextual information is reproduced for the user upon subsequent execution of the stored query. For example, if a stored query is retrieved and reexecuted, the system generally displays the data beginning with the first record, even if in a previous session the user had scrolled through several records before storing the query.

Accordingly, it would be desirable to provide a means of recording a history of queries made to a database without requiring intervention on the part of a user to store a query. It would be further desirable to provide a means to group together data displays that are closely related, for example, data displays that are the result of a user's requests to see successively more detailed portion of a particular view of a database. It would be further desirable to provide a means to display a summary of the stored queries so as to allow selection of a desired query from the list of stored queries.

SUMMARY OF THE INVENTION

The thread management system of the present invention may be implemented within a computer system having a database disposed to be accessed through queries provided by a system user. In this environment the inventive thread management system provides a mechanism for subsequent replication of a sequence of one or more of such queries made by the system user. In a preferred implementation, a first thread step object is generated upon a first of the queries being provided to the database. The thread step object is formed so as to include information relating to a first state of the database. A representation of the first thread step object is then presented to the system user via a display of the computer system. Upon the system user selecting the representation of the first thread step object, the first of the queries to the database is replicated.

In another aspect of the present invention, a second thread step object is generated upon provision of a second of the queries to the database. The second thread step object is created so as to include information relating to a second state of the database. A thread object is then formed from the first and second thread step objects, and a representation of the thread object is displayed to the system user. Upon the system user selecting the representation of the thread object, the first and second queries to the database are replicated.

BRIEF DESCRIPTION OF THE DRAWINGS

FIG. 1 depicts an computer system in which may be implemented the thread management system of the present invention.

FIG. 2 depicts a screen to displayed following submission of a query to a database of the computer system of FIG. 1.

FIG. 3 depicts a Screen View Object defined by the thread management system of the present invention.

FIG. 4 depicts a Frame Object of the inventive thread management system.

FIG. 5 depicts a Business Component Object of the inventive thread management system.

FIG. 6 depicts a Thread Array Object of the thread management system of the present invention.

FIG. 7 depicts a Thread Object of the inventive thread management system.

FIG. 8 depicts a Thread Step Object of the thread management system of the present invention.

FIG. 9 depicts a Screen Bookmark Object of the thread management system of the present invention.

FIG. 10 depicts a Frame Bookmark Object of the inventive thread management system.

FIG. 11 depicts a Business Component Bookmark Object defined by the thread management system of the present invention.

FIG. 12 depicts the creation of a Thread Array Object in accordance with the invention.

FIG. 13A is a flow chart representative of the creation of a first Thread Object.

FIG. 13B illustratively represents the various program entities responsible for execution of the program steps shown in FIG. 13A.

FIG. 14A is a flowchart depicting the steps performed during the creation of a Thread Step.

FIG. 14B represents the interrelationships among the various routines involved in the creation of a Thread Step Object 84.

FIG. 15 depicts the screen representation resulting from the steps performed in FIG. 14.

FIG. 16 is a flow chart representative of the creation of a Thread Object other than a first Thread Object.

FIG. 17 is a flow chart representative of the steps involved in the restoration of a Thread Step.

FIG. 18 depicts an exemplary sequence of steps to be performed in restoration of a previously saved thread.

FIG. 19 shows a display of a set of names stored in various Frame Objects.

FIG. 20 depicts steps that may be taken at program termination to store a Thread Array on a disk or other persistent storage.

DESCRIPTION OF SPECIFIC EMBODIMENTS

Introduction and Definitions

The invention relates to a system and method for facilitating the storage and retrieval of database queries performed by a user. A query is an interaction of the user with the database program by which the user requests a portion of the database to be retrieved and displayed. The exact form of the query is not material to the operation of the invention. Any query that is supported by the relational database employed by the invention may be used. Typically, queries may be queries expressed according to a well-known standard such as Structured Query Language (SQL) or Query By Example (QBE). A query may be either independent or dependent. An independent query is a query that is not related to a previously executed query. A dependent query is a query that is defined by selecting data that has been displayed in response to a previously executed query.

In accordance with the invention, an object (i.e., a "thread object") is created when certain independent queries are requested by the user. A thread object represents a series (or "thread") of queries that are initiated as a result of certain independent queries. A thread object is comprised of one or more "thread step objects." Each thread step object represents a query (a "thread step") that is initiated by the user. Thread objects, and its constituent thread step objects, are maintained and stored so as to permit recall of a thread and its constituent thread steps. This advantageously allows recall and reexecution of previously stored queries.

When a user submits an independent query, a thread is begun with a single step that represents the independent query. A user may then request a dependent query by selecting portions of the data displayed on the screen. When the user requests a dependent query, a thread step representing the dependent query is added to the thread. The resulting thread is then stored upon the performance of one of various predefined events. For example, the thread may be stored upon entry of a new independent query, or upon exit from the program.

In one aspect of the invention, a chronological list is displayed of all the threads initiated by the user and stored in system memory. When a desired one of the displayed threads is then selected using conventional pointer (e.g., point and click) operations, the selected thread is recalled and the one of its thread steps corresponding to the most recent dependent query of the thread is then executed.

After the thread step corresponding to the independent query of a thread has been so executed, the user is further provided with a list of the remaining thread steps corresponding to the dependent queries of the thread. The user may then optionally select one these remaining thread steps, at which time the dependent query associated with the selected remaining step is executed. Alternately, the user may submit additional queries, which are then added to the thread.

By facilitating the storage and retrieval of sequences of one or more previously executed queries, the present invention thus facilitates convenient subsequent reexecution of such previously executed queries.

It is contemplated that the thread management system of the invention be implemented in an object-oriented computer system. As used herein, the term "object" refers to an integrated collection of data and functions that describe an entity or business function, as well as the operations capable of being performed on or by the entity or business function. Functions and data contained within an object may be designated as either private or public. Private functions and data may be referenced only by the object in which they are contained. In contrast, private functions and data may be referenced by any object. Objects can also access databases, and serve as interfaces to non-object-oriented subsystems.

A "class" serves as a template that describes the types of data necessary to describe a member of the class, but does not include data that describes any particular member of a class. An object describes a particular member, or "instance" of a class. When an object is created and initialized with data to represent a member, it is said to be "instantiated." For example, a class named EMPLOYEE may specify that an employee has a first name and a last name, a hire date, a salary, etc. When an object of the class EMPLOYEE is instantiated, memory storage is allocated to hold the information and functions for a particular employee. Once an object is instantiated, the data that describes the class member represented by the object can be referenced and manipulated.

Although the present invention is described herein with reference to the C++ language and the Microsoft Foundation Class (MFC) Library, it is understood that any computer language (object-oriented or otherwise) may be used without departing from the spirit or scope of the invention.

In addition, the present invention is described herein by using, by way of example, a relational database comprised of information concerning a salesperson's various leads and opportunities. However, it is understood that the invention may be used with relational databases designed to include other types of subject matter.

System Overview and Screen Displays

FIG. 1 depicts an computer system in which may be implemented the thread management system of the present invention. Computer system 10 is a general purpose computer capable of executing a computer program in accordance with the thread management system of the present invention. Computer system 10 includes a base unit 12 containing a CPU and disk drive (not shown), a keyboard 14 and a pointing device such as mouse 16. The results of operations performed by the computer may be displayed on monitor screen 18 of monitor 20.

FIG. 2 depicts a screen 30 that may be displayed following a user's submission of a query. Screen 30 includes a number of Frames 32. In the example depicted, Screen 30 includes an Opportunity Frame 32a, a Contacts Frame 32b, an Activities Frame 32c and a Notes Frame 32d.

A Frame 32 may be either a list frame or a form frame. A form frame is a frame that displays a single record of data in detailed form in two dimensions. Opportunity Frame 32a is an example of a form frame. A form frame comprises a series of fields 34 that are arrayed in two dimensions, and that contain information about a single record in a database. A particular field 34 of a form frame may be designated as a Key Field 35. The contents of key field of a form frame may be used to provide criteria relating to selection of data to be displayed in one or more list frames. In the exemplary display of FIG. 2, the field labeled "Opportunity" serves as a key field 35.

A list frame is a frame used to display a selected number of records of a database as a series of rows 36. For example, a list frame may display data relating to a row selected by the Key Field 35 of a Form Frame. Each row is displayed in a single dimension, generally the horizontal dimension. In FIG. 2, Contacts Frame 32b is an example of a list frame. Contacts Frame 32b displays a series of rows 36. Each row 36 is displayed horizontally and contains multiple fields 38 corresponding to database fields as specified by the criteria of Key Field 35. In the exemplary display of FIG. 2, Contacts Frame 32b contains only contacts having values for the "Opportunity" field which are equal to the value in Key Field 35.

In FIG. 2, Activities Frame 32c is also a list frame. However, Activities Frame 32c is seen to lack any data entries. This indicates that there exist no Activity records having "Opportunity" fields equal to the value of Key Field 35. Likewise, Notes Frame 32d is also a list frame lacking any data. This indicates that there are not any Notes records in existence having "Opportunity" fields equal to the value of Key Field 35.

As will be more fully described herein, screen 30 further displays a series of Tab Icons 40 capable of being used to initiate threads. As will also be described in further detail, screen 30 additionally includes a Thread Bar 42 and a Thread Array Icon 44 disposed to retrieve and reexecute previously performed queries.

The appearance of the Screen Image 30, including the size and selection of Frames 32, is typically specified in an external screen definition file. The operation of such a screen definition file is not material to the present invention, and will not be further described.

Current Display Objects

FIGS. 3 through 5 depict objects which are jointly representative of the form and content of data presented in a Screen 32. These objects may be collectively referred to as "Current Display Objects." Current Display Objects include the Screen View Object, the Frame Object, and the Business Component Object.

FIG. 3 depicts a Screen View Object 60. Screen View Object 60 is used to hold data descriptive of the state of the screen image currently being displayed as Screen 30. More particularly, Screen View Object 60 comprises a Screen View Object Header 62, and an array of Frame Objects 64. The Screen View Object Header 62 includes Screen Query Name 61 and Screen Name 63. Screen Query Name 61 contains the name of the stored query which led to creation of the Screen 30 represented by Screen View Object 60. Queries may be physically stored by computer system 10 using conventional techniques, and hence the particulars of such techniques will not be further discussed.

Screen Name 63 is a name assigned to the Screen 30. Typically, Screen Name 63 is a composite of a character string that identifies a Form Frame within the Screen 30, and the value contained in the Key Field 35. For example, for the Screen View Object 60 representing the Screen 30 depicted in FIG. 2, the associated Screen Name 63 may be the string "Oppty:Telesales Lan at Best".

The public data portion of Screen View Object 60 may be represented with the following C++/MFC program code, in which CString and CObArray are MFC classes:

```
public:
    CString      m_queryName;    // name of query
    CString      m_viewName;     // name assigned screen
    CObArray     m_frameArray;   // array of frame objects
```

As is described below, Screen View Object 60 additionally contains functions and private data to be used by these public functions. It should be understood that Screen View Object 60 may also include additional functions and data unrelated to the storage and retrieval of previously executed queries.

FIG. 4 depicts a Frame Object 64 in further detail. A Frame Object 64 is an object representative of a Frame 32. In this regard a Frame Object 64 provides a template used to define the type of data to be displayed by a Frame 32.

Frame Object 64 comprises Active Field Name 66, Frame Name 67, and Business Component Object Pointer 68. Active Field Name 66 contains the name of the field, if any, that is selected by the user. Frame Name 67 contains the name assigned to Frame 32. Business Object Pointer 68 points to a Business Component Object 70 that is used in conjunction with the Frame Object 64.

The public data portion of Frame 64 may be represented with the following C++/MFC code, in which CSSBusComp refers to a C++ class derived from the MFC class CObject:

```
public:
    CString       m_activeFieldName;  // name of active field
    CString       m_frameName;        // name of frame
    CSSBusComp*   m_pBusComp;         // pointer to Business
                                      //   Object
```

Frame Object 64 additionally contains functions and private data to be used by these functions as more fully disclosed herein. Also, Frame Object 64 may contain additional functions and data unrelated to the storage and retrieval of previously executed queries.

FIG. 5 depicts a Business Component Object 70. Business Component Object 70 is used to define that data displayed in the template defined by Frame Object 64. Business Component Object 70 comprises a Business Component Name 72, a Business Query 74, a Sort Specification 76, and a Row ID 78. Business Component Name 72 contains the name of the business object. Business Component Name 72 is set to the same value as the Frame Name 67 of the Frame Object 64 that points to the Business Component Object. Business Query 74 includes a description of the query used to retrieve the data represented by the business object (e.g., an SQL or QBE query). Sort Specification 76 contains a list of fields by which the data is ordered, and an indicator of whether the data is ordered in an ascending or descending sequence. RowID 78 contains a value that indicates the number of the row at which the data displayed in the Frame 32 is positioned. The public data portion of Screen View Object 70 may be represented with the following C++/MFC code:

```
public:
    CString   m_busCompName    // name of business object
    CString   m_busQuery       // query used to retrieve data
    Cstring   m_sortSpec       // specification of sort order
    CString   m_selRowId       // Number of current row displayed
```

As more fully disclosed herein, Business Component Object 70 additionally contains other functions and private data to be used by the above public functions. Also, Business Component Object 80 may contain additional functions and data unrelated to the storage and retrieval of previously executed queries.

In summary, a Screen Object 60 serves to define the form and content of a Screen 30. Just as a Screen 30 comprises multiple Frames 32, Screen Object 60 comprises a plurality of Frame Objects 62. Each Frame Object 62 defines a frame template, and points to a Business Object 70 which includes data used to populate the template defined by Frame Object 32.

Stored Objects

FIGS. 6 through 11 depict objects that are used to capture and maintain the state of a plurality of Screen View Objects 30, and their constituent Frame Objects 64 and Business Component Objects 70, for later retrieval. These objects stored for subsequent retrieval may be collectively referred to as "Stored Objects." Stored Objects include the Thread Array Object, the Thread Object, the Thread Step Object, the Screen Bookmark Object, the Frame Bookmark Object, and the Business Object Bookmark.

FIG. 6 depicts a Thread Array Object 80. Thread Array Object 80 comprises an array of Thread Objects 82. Thread Array Object 80 will be used in the manner described herein to provide the basis for a historical list of previously executed threads. The public data portion of Thread Array Object 80 may be represented with the following C++/MFC program code:

```
public:
    CObArray   m_threadArray;    // array of thread objects
```

As described herein, Thread Array Object 80 additionally contains functions and private data to be used by these public functions. Also, Thread Array Object 80 may contain additional functions and data unrelated to the storage and retrieval of previously executed queries.

FIG. 7 depicts a Thread Object 82. Thread Object 82 comprises an array of Thread Step Objects 84. Thread Object 82 will be used as further described herein to provide the basis for a historical list of thread steps that have been previously executed within a particular selected thread. The public data portion of Thread Object 82 may be represented with the following C++/MFC program code:

```
public:
    CObArray   m_stepArray;    // array of thread step objects
```

As described herein, Thread Array Object 82 additionally contains functions and private data to be used by these public functions. Also, Thread Array Object 82 may contain additional functions and data unrelated to the storage and retrieval of previously executed queries.

FIG. 8 depicts a Thread Step Object 84. Thread Step Object 84 contains a Thread Step Field Value 87, a Thread Step Title 85, pointer 86 to a Screen Bookmark Object 88. Thread Step Field Value 87 may be set to a value used to perform a dependent query in the thread step, as is more fully explained herein. Thread Step Title 85 contains a title that will be used in a graphical display of available thread steps. The public data portion of Thread Step Object 84 may be represented with the following C++/MFC program code, in which CSSViewBookmark refers to a C++ class derived from the MFC class CObject:

```
public
    CString             m_fieldValue      // thread step field value
    CString             m_title           // thread step title
    CSSViewBookmark*    m_pViewBookmark;  // pointer to Screen BookMark
```

As described herein, Thread Step Object 84 additionally contains functions and private data to be used by these public functions. Also, Thread Step Object 84 may contain additional functions and data unrelated to the storage and retrieval of previously executed queries.

FIG. 9 depicts a Screen Bookmark Object 88. A Screen BookmarkObject is used to hold information needed to rebuild a Screen Object 60 when selected for retrieval by the user. Screen Bookmark Object 88 includes a Screen Bookmark Query Name 90, a Screen Bookmark View Name 92, an Screen Bookmark Active Frame Name 94, and an array of Frame Bookmark Objects 96. Screen Bookmark Query Name 90, and Screen Bookmark View Name 92 are used as storage for Screen Object 60's Query Name 61 and Screen View Name 63, respectively. Screen Bookmark Active Frame Name 94 is used to store the name of a currently active Frame 62. Frame Bookmark Objects 96 are used to rebuild a plurality of Frame Objects 64 when a Screen Object containing them is rebuilt.

The public data portion of Screen Bookmark Object 88 may be represented with the following C++/MFC program code:

```
public
    CString   m_currentQueryName;    // storage for query name
    Cstring   m_viewName;            // storage for screen name
```

```
CString    m_activeFrameName;      // storage for active frame name
CobArray   m_frameBookmarkArray;   // array of Frame Bookmarks
```

As described herein, Screen Bookmark Object 88 additionally contains functions and private data to be used by these public functions.

FIG. 10 depicts a Frame Bookmark Object 96. A Frame Bookmark Object is used to hold information needed to rebuild a Frame Object 64 when a Screen Object 60 in which the Frame Object 64 is contained is selected for retrieval by the user. Frame Bookmark Object 96 includes a Frame Bookmark Frame Name 98, a Frame Bookmark Active Field Name 100, and a pointer 102 to a Business Component Bookmark 104. Frame Bookmark Frame Name 98 and Frame Bookmark Active Field Name 100 are used as storage for Frame Object 64's Frame Name 67 and Active Field Name 66, respectively.

The public data portion of Frame Bookmark Object 96 may be represented with the following C++/MFC program code, in which CSSBCBookmark refers to a C++ class derived from the MFC class CObject:

```
public:
    CString          m_activeFrameName;   // storage for active frame name
    CString          m_activeFieldName    // storage for active field name
    CSSBCBookmark*   m_pBCBookmark;       // pointer to business component
                                          // bookmark
```

As described herein, Frame Bookmark Object 96 additionally contains functions and private data to be used by these public functions.

FIG. 11 depicts a Business Component Bookmark Object 102. A Business Component Bookmark is used to hold information needed to obtain the data to complete a Frame Object 64 when a Screen Object 60 in which the Frame Object 64 is contained is selected for retrieval by the user. Business Component Bookmark Object 102 includes a Business Component Bookmark Name 72, a Business Component Bookmark Query 74, a Business Component Bookmark Sort Specification 76, and a Business Component Bookmark Row ID 78. Business Component Bookmark Name 72, a Business Component Bookmark Query 74, a Business Component Bookmark Sort Specification 76, and a Business Component Bookmark Row ID 78 are used as storage for Business Component Object 70's Business Component Name 72, a Business Query 74, a Sort Specification 76, and a Row ID 78, respectively.

The public data portion of Business Component. Bookmark Object 102 may be represented with the following C++/MFC code:

```
public:
    CString  m_CompName;   // name of business object
    CString  m_Query;      // query used to retrieve data
    CString  m_sortSpec;   // specification of sort order
    Cstring  m_selRowId;   // Number of current row displayed
```

As described herein, Business Component Bookmark Object 102 additionally contains functions and private data to be used by these public functions.

Operation of the Thread Management System

The thread management system of the present invention contemplates performance of at least the following operations relating to the archival and retrieval of queries. These operations include: Thread Array Creation; Thread Array Archival; First Thread Creation; Thread Step Creation; Thread Creation other than a First Thread; Thread Step Retrieval; and Thread Restoration. In an exemplary embodiment of the present invention, an object-oriented computer program hereinafter referred to as a Frame Manager, is executed to perform these operations. A description will now be provided of the manner in which the Frame Manager performs each of these operations.

Thread Array Creation

The archival or retrieval of any threads involves creation of a Thread Array Object 84 upon program initialization. FIG. 12 depicts the creation of Thread Array Object 84.

Referring to FIG. 12, in step 120 a Thread Array Object creation routine is seen to begin execution. In step 122, the routine checks as to whether a Thread Array Object 84 is found in persistent storage, e.g., storage implemented as an MFC CArchive object. If a Thread Array Object 84 is found, the routine proceeds to step 124 and loads the previously stored Thread Array Object 84. If no Thread Array Object 84 is found, the routine instantiates a Thread Array Object having a dimension of 0; that is, an object having no entries. Following either step 124 or 126, the routine proceeds to step 128 and exits from the Tread Array Object routine.

First Thread Creation

After a Thread Array Object has been defined in the manner described above, it will nonetheless lack Thread Objects until a first thread has been initiated by a user. A thread is initiated upon submission by a user of a first query.

FIG. 13A is a flow chart representative of the creation of a first Thread Object. In step 140, the user enters a query to begin the process of creation of a Thread Object. This may be effected by, for example, selecting: a Tab Icon 40 on Screen Image 30 with a mouse or other pointing device 16 or a screen from the SCREEN menu item on Menu 41.

In response to entry of the user query in step 140, in step 142 the screen name is identified which corresponds to the screen image to be displayed. This may be done, for example, by referencing the title of the Tab Icon 40 or option from SCREEN menu item on menu 41. Because this query bears no relation to a previously submitted query, it is defined as an independent query and a new thread is begun.

Also in response to the entry of a query in step 140, control is transferred to a routine hereinafter referred to as BuildView. As is indicated in FIG. 13B, the BuildView routine takes as input two parameters; namely, a value for a screen name and a context value. The screen name from step 142 is used to supply a value for the screen name. The context value is set to "normal," indicating that the operation is neither a dependent query nor a restoration of an archived thread or thread step.

In step 144, the BuildView routine instantiates a Screen View Object 60 to represent a screen to be displayed. The BuildView routine sets Screen Query Name 61 to the value of the query that was loaded in step 140. Screen Name 63 is set to the value determined in step 142. Because Frame Objects 64 are contained within Screen View Object 60 (FIG. 3), Frame Objects 64 (FIGS. 3 and 4) are also instantiated when Screen View Object 60 is instantiated. For each Frame Object instantiated, the Frame Name 67 is set to the value of the frame as defined in the screen definition file. For each Frame Object 64, a Business Component Object 70 is also instantiated, and pointer 68 is set to point to the newly instantiated Business Component Object 70 (FIG. 4). For each Business Component Object 70, a query is executed to retrieve data for its corresponding Frame. This results in the retrieval of every record in the database table of the corresponding Frame having a value specified by Key Field 35. At this point, a full Screen View Object 60 has been built and initialized, and can now be rendered into a screen image 30 and displayed to the user.

In step 146, the BuildView routine instantiates a Thread Object 82 and then also instantiates a Thread Step Object 60 (FIG. 3). The Thread Step Title 85 is initialized with the value of the screen name (FIG. 8). The Thread Step Field Value 87 and Screen Bookmark Pointer 86 are not initialized (FIG. 8). In this regard such an uninitialized thread step is referred to as an "empty step." In an exemplary embodiment of the thread management system the last (or only) step in a thread comprises an empty step.

Upon execution of step 146, Thread Array Object 80 contains a single Thread Object 82, which in turn contains a single Thread Step Object representative of an empty step.

Thread Step Creation from a Dependent Query

As noted above, a Thread Step Object 84 is created as part of the creation of a Thread Object 82. Additional Thread Step Objects 84 are also created within a Thread Object 82 in response to a dependent query.

A dependent query is invoked by selecting a key field in a list frame for a more detailed inquiry. This provides the effect of "drilling down" into a database to get further information on the data displayed. For example, in FIG. 2 the Contacts Frame 32b may be characterized as a list frame containing data. As indicated in FIG. 2, the key field of Contacts Frame 32b is the "Last Name" field. For example, a dependent query may be performed by using pointer 16 to select a row in Contacts Frame 32B. This results in the system performing a dependent query. Specifically, a query associated with the frame is submitted and the Contacts screen is used to display the resulting data. The query is a dependent query in that it is dependent upon data already having been retrieved and displayed by a prior independent query.

FIG. 14A is a flowchart depicting the steps performed during the creation of a Thread Step Object 84 in response to a dependent query. In addition, FIG. 14B represents the interrelationships among the various routines involved in the creation of this Thread Step Object 84.

Referring now more specifically to FIG. 14, in step 160, the user initiates a dependent query, e.g., by using pointer 16 to select the row as described above. In step 162 the screen name is identified. Typically, the screen name will be the same as the frame name from which the dependent query was invoked, in this example, "Contact." The BuildView routine is then called, taking as parameters the screen name "Contact" and a context parameter referred to as "DRILL-DOWN". In this regard the "DRILLDOWN" context indicates that the operation resulting in invocation of the BuildView routine comprised a dependent query (i.e., rather than an independent query).

The DRILLDOWN context is an indication to the BuildView routine that data has already been presented to the user in response to a previous query. Therefore, the status of the prior query must be recorded so that it may later be retrieved. In step 164, a Screen Bookmark Object 88 (FIG. 9) is created to preserve the status of the Screen View Object 60 representative of the currently displayed screen image. The BuildView routine calls a Screen::CreateBookMark function, a function located in Screen Object 60, in order to create Screen Bookmark Object 88.

As indicated in FIG. 14B, Screen::CreateBookmark instantiates a Screen Bookmark Object 88. Screen::CreateBookmark sets Screen Bookmark Query Name 90 to the value in Screen Query Name 61. Screen::CreateBookmark sets Screen Bookmark View Name 92 to the value in Screen View Name 63. Screen::CreateBookmark sets Screen Bookmark Active Frame Name 94 to the name of the Frame Object 64 currently designated as the active Frame Object in Screen View Object 60.

In step 166, for each Frame Object 64 that is contained within Screen View Object 60, Screen::CreateBookmark invokes the function Frame::CreateBookmark. Each invocation of Frame::CreateBookmark instantiates a Frame Bookmark Object 96 within Screen Bookmark Object 88. Frame::CreateBookmark sets Active Field Name 66 to the name of the field that is currently active within the Frame 32 for which Frame::Bookmark is being called. Frame::CreateBookmark sets Frame Name 67 to the frame name of the Frame 32 for which Frame::Bookmark is being called.

Each time the routine Frame::CreateBookmark is invoked, it also invokes BusinessObject::CreateBookmark to instantiate and initialize a Business Component Object Bookmark 70 for each Frame 32. Each BusinessObject::Bookmark invocation stores in its Business Component Bookmark Object 70: (i) the name of the business object for that frame in Business Component Name 106; (ii) the search instruction in effect for that frame in Query 108; (iii) the sort specification in Sort Spec 110; and (iv) the ID of the Row at which the frame is positions in Row ID 112.

In step 168 the routine ThreadArray::UpdateThread is invoked in order to update the current Thread Object 82. ThreadArray::UpdateThread is passed a field value of the selected field of the current screen (in this example, "Telesales Lan at Best"), as well as the Screen Bookmark Object created in step 164 (which includes as constituent parts of a set of Frame Bookmark Objects and Business Component Bookmark Objects). ThreadArray::UpdateThread selects the last Thread Step Object 84 in the current Thread Object 82, and updates it with the passed field value and the Screen Bookmark Object. ThreadArray::UpdateThread invokes the function ThreadArray::AddStepToThread. ThreadArray::AddStepToThread instantiates a new Thread Step Object 84, adds it into Thread Object 80 as a new empty step, and uses the name of the new screen as the Thread Step Title 85.

In step 170, the Frame Manager destroys the current Screen Object 60. In Step 172, the Frame Manager instantiates a new Screen Object. The Screen Object 60 instantiates Frame Objects 64, which in turn instantiate Business Component Objects 70 and directs it to perform the query stored in its corresponding Business Component Bookmark Object. This process is substantially similar to the process of creating a new Screen Object 60 for an independent query (step 144). As each Frame Object 64 is instantiated, the Frame Object calls the function BusinessObject::Execute in order to execute the stored query associated with the frame, and the function BusinessObject::Home in order to request the Business Object to position itself at row 1 of its data retrieved. In response, the Business Component Object 70 calls FrameObject::NotifyNewData to notify the Frame that new data has been loaded in response to the query. FrameObject::NotifyNewData repeatedly calls the Business Component Object 70 to obtain a row-by-row list of data to be displayed. When it has completed displaying the data, Frame::NotifyNewData returns to BusinessObject::Home, which in turn returns control to the Frame Object 64.

In Step 174, the data in the screen image represented by Screen Object 60, including its constituent Frame Objects 64, is displayed.

FIG. 15 depicts the result of the steps performed in FIG. 14. Screen Image 30 now reflects the contents of the Screen View Object 60 that was created in step 172. Specifically, Screen Image 30 comprises a Contacts Frame 172, a Contacts Detail Frame 174, and an Activities Frame 176. Thread Bar 42, which serves as a graphical representation of Thread Object 82, now includes two Thread Step Icom 178 and 180. Thread Step Icon 178 represents the Thread Step previously displayed, i.e. as Screen 30 of FIG. 2. Thread Step Icon 178 indicates that the prior screen was an Opportunity Screen, and that the value of its Key Field 35 was "Telesales Lan at Best." In contrast, Thread Step Icon 180 represents the currently displayed screen. Specifically, Thread Step Icon 180 indicates that the screen is a Contacts Screen, and as the last Thread Step in the Thread, is represented as an empty step, i.e., with no value displayed in the Thread Step Icon.

Thread Creation Other Than a First Thread

Additional threads are formed in a manner that is substantially similar to that described in the preceding sectio. During this process, the current thread, which is being replaced by the new thread, must be recorded through the use of bookmarks. As described below, this recordation of prior thread objects using bookmarks is similar to the manner in which prior thread step objects are recorded during drilldown operation.

FIG. 16 is a flow chart representative of the creation of a Thread Object other than a first Thread Object. In step 190, the user enters a query to begin the process of creation of a Thread Object. This may be effected by, for example, selecting one of the following using a pointing device 16: a Tab Icon 40 on Screen Image 30, a screen from the SCREEN menu item on Menu 41, or the QUERY menu item on Menu 41 to request loading a previously stored query.

In response to entry of the user query in step 190, in step 192 the screen name is identified which corresponds to the screen image to be displayed. This may be done, for example, by referencing the title of the Tab Icon 40 or option from SCREEN menu item on menu 41.

Because this query bears no relation to a previously submitted query, it is defined as an independent query and a new thread is begun.

Also in response to the entry of a query in step 190, control is transferred to the BuildView routine. As with the creation of the first thread, the BuildView routine takes as input two parameters; namely, a value for a screen name and a context value. The screen name from step 192 is used to supply a value for the screen name. The context value is set to "normal," indicating that the operation is neither a dependent query nor a restoration of an archived thread or thread step.

In step 194, a Screen Bookmark Object 88 is created to preserve the status of the Screen View Object 60 that represents the currently displayed screen image. The BuildView routine calls the Screen::CreateBookMark function, which instantiates a Screen Bookmark Object 88. The Screen::CreateBookmark function sets Screen Bookmark Query Name 90 to the value in Screen Query Name 61, and sets Screen Bookmark View Name 92 to the value in Screen View Name 63. In addition, the Screen::CreateBookmark function sets Screen Bookmark Active Frame Name 94 to the name of the Frame Object 64 currently designated as the active Frame Object within the Screen Object.

In step 196, for each Frame Object 64 that is contained within Screen View Object 60, the function Screen::CreateBookmark invokes the function Frame::CreateBookmark. Each invocation of Frame::CreateBookmark instantiates a Frame Bookmark Object 96 within Screen Bookmark Object 88. Frame::CreateBookmark sets Active Field Name 66 to the name of the field that is currently active within the Frame 32 for which Frame::Bookmark is being called. In addition, Frame::CreateBookmark sets Frame Name 67 to the frame name of the Frame 32 for which Frame::Bookmark is being called.

The function Frame::CreateBookmark also invokes the function BusinessObject::CreateBookmark to instantiate and initialize a Business Component Object Bookmark 70 for each Frame 32. Each invocation of BusinessObject::Bookmark stores in its Business Component Bookmark Object 70: (i) the name of the business object for that frame in Business Component Name 106; (ii) the search instruction in effect for that frame in Query 108; (iii) the sort specification in Sort Spec 110; and (iv) the ID of the Row at which the frame is positioned in Row ID 112.

In step 198, the function ThreadArray::EndThread is invoked in order to end the current thread in anticipation of its replacement by the new thread. In order to to update the current Thread Object 82, the function ThreadArray::EndThread invokes the function ThreadArray::UpdateThread. The function ThreadArray::UpdateThread is passed a field value of the selected field of the current screen (in this example, "Telesales Lan at Best"), and the Screen Bookmark Object created in step 164 (which includes as constituent parts a set of Frame Bookmark Objects and Business Component Bookmark Objects). ThreadArray::UpdateThread selects the last Thread Step Object 84 in the current Thread Object 82, and updates it with the passed field value and the Screen Bookmark Object:

Because the process of FIG. 16 concerns replacement of an entire Thread, the function ThreadArray::AddStepToThread is not invoked for an independent query. Instead, in step 200, the EndThread function stores the current Thread Object in Thread Array Object 80.

In step 202, the current Screen Object 60 is destroyed by the Frame Manager.

In step 204, the BuildView routine instantiates a Screen View Object 60 to represent a screen to be displayed. The BuildView routine sets Screen Query Name 61 to the value of the query that was loaded in step 140. Screen Name 63 is set to the value determined in step 142. Because Frame Objects 64 are contained within Screen View Object 60 (FIG. 3), Frame Objects 64 (FIGS. 3 and 4) are also instantiated when Screen View Object 60 is instantiated. For each Frame Object instantiated, the Frame Name 67 is set to the value of the frame as defined in the screen definition file. For each Frame Object 64, a Business Component Object 70 is also instantiated, and pointer 68 is set to point to the newly instantiated Business Component Object 70 (FIG. 4). For each such newly instantiated Business Component Object 70, a query is executed to retrieve data for its corresponding Frame. This results in the retrieval of those records specified by key field 35 from this corresponding Frame. At this point, a full Screen View Object 60 has been built and initialized, and can now be rendered into a screen image 30 and displayed to the user.

In step 206, the BuildView routine instantiates a Thread Object 82 and in then also instantiates a Thread Step Object 60 (FIG. 3). The Thread Step Title 85 is initialized with the value of the screen name (FIG. 8). The Thread Step Field Value 87 and Screen Bookmark Pointer 86 are not initialized (FIG. 8). As in the instantiation of the first Thread Object, the last (or only) step in a thread comprises an empty step.

Upon execution of step 206, Thread Array Object 80 contains a new Thread Object 82, which in turn contains a single Thread Step Object representative of an empty step.

In step 208, the screen image represented by the new Screen View Object 60 is displayed.

Thread Step Retrieval

The thread management system of the invention allows Thread Steps that have previously been stored to be subsequently retrieved. FIG. 17 is a flow chart representative of the steps involved in such restoration of a Thread Step.

In step 220, the user identifies a Thread Step within the current thread to be restored. This will typically be accomplished by selecting a Thread Step Icon from Thread Bar 31 (e.g., Thread Step Icon 178 (FIG. 15)).

In step 222, in response to the user identification of a Thread Step to be restored, the Thread Step Object 84 corresponding to the selected Thread Step is located in the current Thread Object 82 by the Frame Manager.

Also in response to the identification of the Thread Step on step 222, control is transferred to the BuildView routine. The BuildView routine takes as input three parameters. As discussed above, BuildView takes as input a value for a screen name and a context value. The screen name used in this invocation comes from the Screen View Name 92 found in the Screen Bookmark Object 88 that is associated with the identified Thread Step Object 84. The context value is set to "restore," to indicate restoration of an archived thread or thread step. In addition, a third parameter, unique to restoration operations, is supplied to the BuildView routine. In the exemplary embodiment, the third parameter comprises a Screen Bookmark object 88.

In step 226, the BuildView routine constructs a new Screen View Object 60 in the usual manner, including Screen View Object's 60 constituent Frame Objects 64 and Business Component Objects 70.

In step 228, the BuildView routine calls the Screen::GoToBookmark function. The Screen::GoToBookmark function initializes the name and active fields of Screen View Object 60 from the values stored in the Screen Bookmark Object 88. The Screen::GoToBookmark function then, for each Frame in the Screen Object, calls the Function Frame::GoToBookmark. In each invocation of Frame::GoToBookmark, the Frame Name 67 is set from Frame Bookmark Object Frame Name field 98, and Active Field Name 66 is set from Frame Bookmark Object Active Field Name 100. Additionally, each invocation of Frame-::GoToBookmark invokes its associated Business Object Bookmark by invoking BusinessObject:: GoToBookmark. Each invocation of BusinessObject::GoToBookmark sets: (i) the Business Component Name 72 from the saved value Business Component Name 106; (ii) the Business Component Query Name 74 from the saved bookmark value Business Component Query Name 108; (iii) Business Component Sort Spec 76 from saved value Business Component Bookmark Sort Spec 110; and (iv) Business Component Row ID 78 from saved value Business Component Bookmark Row ID 112.

In step 230, the Screen View Object 60 is populated. Each Frame Object 64 is consecutively processed to execute ots stored query. Each Frame Object 64 in turn calls its associated Business Component Object 70. Each Business Component Object 70 sets an execution indicator that it has previously been executed. In addition, each Business Component Object 70 calls Frame::NotifyNewData to notify the associated Frame Object 64 that its data is ready for display. The Execution indicator informs Frame::NotifyNewData that the RowID 78 in the Business Component Object 70 reflects meaningful data; that is, that the Business Component Object 70 is positioned to a valid table row according to direction from a Business Component Bookmark Object. The function Frame::NotifyNewData thus does not call BusinessObject::Home in order to reposition the Business object to the first row of data in the table displayed in the frame. Frame::NotifyNewData will instead prepare the table for display starting at the row identified by RowID 78.

In step 232, the screen image corresponding to the newly recovered Screen View Object is displayed.

Thread Restoration

In addition to facilitating the restoration of thread steps in a current thread, the present invention also enables restoration of a previously saved thread. FIG. 18 depicts an exemplary sequence of steps to be performed in restoration of a previously saved thread. In step 240, the user requests a graphical representation of Thread Array 80 to be displayed. This can be requested, for example, by clicking on Thread Array Icon 44 (FIG. 2). In response, a display of the names associated with all previously stored threads is displayed. Specifically, the names stored in the first Frame Objects 64 in each of the Thread Objects 82 are presented for display. FIG. 19 depicts one such possible display.

In step 242, the user selects a thread desired to be restored.

In step 244, the frame manager finds and selects the Thread Object 82 corresponding to the Thread Object name selected by the user in step 242. This may be done, for example, by iterating through each of the Thread Objects 82 and comparing the name selected in step 242 to the name stored in the Frame Object 64 contained in the Thread Object 82 until a match is found.

In step 246, the Frame Manager similarly searches for the last Thread Step Object in the Thread Object selected in step 244. Finally, in step 248; the invention performs a step restore process, as has previously been discussed in connection with FIG. 17 above.

Thread Array Archival

Generally, the Thread Array 80 is read from disk or other persistent storage at time of initialization. The manipulations of the Thread Array and its constituent objects (including all bookmarks) is contemplated to be performed on an image of the Thread Array 80 in storage. Therefore, it is necessary to provide a means by which the Thread Array may be stored on disk or other persistent storage so as to be available for reloading at a future time. Typically, this is performed only at program termination.

FIG. 20 depicts steps that may be taken at program termination to store Thread Array 80 on a disk or other persistent storage. In step 260, the invention determines whether a thread is in progress. If so, in step 262, the current thread is stored. The steps required to store the current "in progress" thread are substantially similar to those previously described with reference to FIG. 16. However, there is of course no need to create a new thread and the objects attendant thereto during the process of storing the current "in progress" thread.

MFC provides a SERIALIZE function that serves to save an object to persistent storage. In step 264, a SERIALIZE function is performed on Thread Array Object 80, causing the Thread Array Object 80 to be stored. In step 266, the Thread Array Object performs a SERIALIZE function on each of its constituent Thread Objects 82, causing each of the Thread Objects 82 to be stored.

In step 268, each of the Thread Objects 82 performs a SERIALIZE function on each of its constituent Thread Step Objects 84 to be stored. In step 270, each of the Thread Step Objects performs a SERIALIZE function on its respective Screen Bookmark Object 88, causing each such respective Screen Bookmark Object 88 to be stored.

In step 272, each of the Screen Bookmark Objects 88 performs a SERIALIZE function on each of its Frame Bookmark Objects 96, causing each of the Frame Bookmark Objects to be stored. In step 274, each of the Frame Bookmark Objects 96 performs a serialization function on its respective Business Component Bookmark Object 104, causing each such respective Business Component Bookmark Object 104 to be stored.

In step 276, termination of the frame manager program involves storing all of the Thread Array 80 and its constituent components.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method of selecting and presenting data from a database using a database query language to a user of a computer system, said method comprising the steps of:
   a) providing at least one frame bookmark object that specifies a format for the display of data;
   b) for each of said at least one frame bookmark objects, providing a component bookmark object that specifies a criterion for data to be displayed according to the format specified by said frame bookmark object;
   c) retrieving data from a database according to the a criterion specified by said component object; and
   d) displaying said data according to the format specified in said at least one frame bookmark object.

2. The method of claim 1, said method further comprising the steps of:
   a) dividing a screen image into a plurality of screen sectors;
   b) mapping each of said frame objects to at least one of said screen sectors.

3. The method of claim 1, said method further comprising the steps of providing at least one thread object that comprises said at least one frame bookmark object.

4. The method of claim 3, said method further comprising the steps of
   a) providing a thread array object that comprises said at least one thread object, and
   b) presenting said user with a display of said at least one thread object, and
   c) selecting said thread object in response to indicia specified by the user.

5. In a computer system having a database disposed to be accessed through queries using a database query language made to said database, a method for replicating a sequence of one or more of said queries made by a system user, said method comprising the steps of:

generating a first thread step object upon providing a first of said queries to said database, said thread step object including information relating to a first state of said database;

displaying a representation of said first thread step object upon a display of said computer system; and replicating said first of said queries to said database upon selection by said user of said representation of said first thread step object.

6. The method of claim 5 further including the steps of:

generating a second thread step object upon providing a second of said queries to said database, said second thread step object including information relating to a second state of said database, and forming a thread object from said first and second thread step objects.

7. The method of claim 6 further including the steps of:

displaying a representation of said thread object, and replicating said first and said second of said queries to said database upon selection by said user of said representation of said thread object.

8. In a computer system having a database disposed to be accessed through queries using a database query language made to said database, a system for replicating a sequence of one or more of said queries made by a system user, said system comprising:

means for generating a first thread step object upon providing a first of said queries to said database, said thread step object including information relating to a first state of said database;

means for displaying a representation of said first thread step object upon a display of said computer system; and means for replicating said first of said queries to said database upon selection by said user of said representation of said first thread step object.

9. The system of claim 8 further including:

means for generating a second thread step object upon providing a second of said queries to said database, said second thread step object including information relating to a second state of said database, and means for forming a thread object from said first and second thread step objects.

10. The system of claim 9 further including:

means for displaying a representation of said thread object, and means for replicating said first and said second of said queries to said database upon selection by said user of said representation of said thread object.

* * * * *